(12) United States Patent
Chen et al.

(10) Patent No.: US 12,105,408 B2
(45) Date of Patent: Oct. 1, 2024

(54) OPTICAL ELEMENT DRIVING MECHANISM

(71) Applicant: TDK TAIWAN CORP., Taoyuan (TW)

(72) Inventors: Yung-Yun Chen, Taoyuan (TW);
Yu-Chi Kuo, Taoyuan (TW);
Xuan-Huan Su, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 78 days.

(21) Appl. No.: 18/156,820

(22) Filed: Jan. 19, 2023

(65) Prior Publication Data

US 2023/0236476 A1    Jul. 27, 2023

Related U.S. Application Data

(60) Provisional application No. 63/303,744, filed on Jan. 27, 2022.

(51) Int. Cl.
| | |
|---|---|
| *G03B 9/06* | (2021.01) |
| *G01B 7/00* | (2006.01) |
| *G02B 7/00* | (2021.01) |
| *G02B 27/00* | (2006.01) |
| *G03B 30/00* | (2021.01) |

(52) U.S. Cl.
CPC .............. *G03B 9/06* (2013.01); *G01B 7/003* (2013.01); *G02B 7/005* (2013.01); *G02B 27/0012* (2013.01)

(58) Field of Classification Search
CPC .................................. G03B 9/06; G03B 30/00
See application file for complete search history.

(56) References Cited

U.S. PATENT DOCUMENTS

| | | | | |
|---|---|---|---|---|
| 8,164,813 | B1 * | 4/2012 | Gat | G02B 5/005 |
| | | | | 396/510 |
| 8,475,064 | B2 * | 7/2013 | Bai | G03B 9/18 |
| | | | | 396/463 |
| 10,761,403 | B2 * | 9/2020 | Wang | H04N 23/73 |
| 11,156,898 | B2 * | 10/2021 | Seo | G03B 30/00 |

FOREIGN PATENT DOCUMENTS

| | | | | | |
|---|---|---|---|---|---|
| CN | 113885271 | A | * | 1/2022 | |
| KR | 2020009822 | A | * | 1/2020 | G03B 17/02 |
| WO | WO-2019235788 | A1 | * | 12/2019 | G02B 27/646 |

* cited by examiner

*Primary Examiner* — Leon W Rhodes, Jr.
(74) *Attorney, Agent, or Firm* — MUNCY, GEISSLER, OLDS & LOWE, PC

(57) ABSTRACT

An optical element driving mechanism is provided in the present disclosure, including a fixed portion, a first movable portion, and a driving assembly. The first movable portion is movable relative to the fixed portion. The driving assembly drives the first movable portion to move relative to the fixed portion. The first movable portion brings an optical element to move.

18 Claims, 10 Drawing Sheets

OPTICAL ELEMENT DRIVING MECHANISM

CROSS REFERENCE TO RELATED APPLICATIONS

This application claims the benefit of U.S. Provisional Application No. 63/303,744, filed Jan. 27, 2022, the entirety of which is incorporated by reference herein.

BACKGROUND OF THE INVENTION

Field of the Invention

The present invention relates to an optical element driving mechanism, and, in particular, to an optical element driving mechanism for adjusting the size of an aperture.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices to consumers.

Electronic devices that have image-capturing or video-recording functions normally include an optical module, and require functions of using an optical element driving mechanism to adjust the size of an aperture in order to change amount of light entering the module. Light may pass through the optical module and the optical element driving mechanism and may form an image on an optical sensor. However, the trend in modern mobile devices is to have a smaller size and a higher durability. As a result, how to effectively reduce the size of the optical module and how to increase its durability has become an important issue.

BRIEF SUMMARY OF THE INVENTION

An optical element driving mechanism is provided in the present disclosure, including a fixed portion, a first movable portion, and a driving assembly. The first movable portion is movable relative to the fixed portion. The driving assembly drives the first movable portion to move relative to the fixed portion. The first movable portion brings an optical element to move.

In some embodiments, the optical element driving mechanism further includes one or more first guiding assemblies. The one or more first guiding assemblies each includes a first guiding element and a first guiding opening. The first guiding element protrudes from an upper surface of the fixed portion. The first guiding opening is disposed on the first movable portion. The first guiding element passes through the first guiding opening. With the one or more first guiding assemblies, the first movable portion is movable relative to the fixed portion in a first dimension.

In some embodiments, the optical element driving mechanism further includes a second movable portion and a second guiding assembly. The second movable portion has a plastic material, is parallel to the fixed portion, and is movable relative to the first movable portion. The second guiding assembly includes a second guiding element, a second guiding opening, and a limiting cavity. The second guiding element protrudes from a lower surface of the second movable portion. The second guiding opening is disposed on the first movable portion. The second guiding element passes through the second guiding opening. The limiting cavity is disposed on the fixed portion, corresponding to the second guiding element and limiting the moving range of the second guiding element. With the second guiding assembly, the first movable portion leads the second movable portion to move relative to the fixed portion in a second dimension.

In some embodiments, the driving assembly includes a first driving element, a first clamping portion, a second driving element, and a second clamping portion. The first driving element includes a shape memory alloy. The first clamping portion includes a first clamping part located at a first corner of the fixed portion and a second clamping part located at a second corner of the fixed portion. The first clamping part and the second clamping part hold the two ends of the first driving element. The second driving element includes a shape memory alloy. The second clamping portion includes a third clamping part located at the first corner of the fixed portion and a fourth clamping part located at the second corner of the fixed portion. The third clamping part and the fourth clamping part hold the two ends of the second driving element. The first clamping part and the third clamping part that are located at the first corner are disposed perpendicularly to each other, and the second clamping part and the fourth clamping part that are located at the second corner are disposed perpendicularly to each other.

In some embodiments, the optical element driving mechanism further includes a circuit assembly. The driving assembly is disposed between the fixed portion and the circuit assembly. The first driving element is electrically connected to the circuit assembly via the first clamping portion, and the second driving element is electrically connected to the circuit assembly via the second clamping portion.

In some embodiments, the second guiding assembly is located at the second corner of the fixed portion.

In some embodiments, the first movable portion includes a main plate, a first contact element, and a second contact element. The main plate has a metal material and a plate structure. The main plate is disposed in parallel to the fixed portion. The main plate is disposed between the second movable portion and the fixed portion. The first contact element has a plastic material, corresponds to a first through hole of the fixed portion, and is in contact with the first driving element. The first through hole is located at a third corner of the fixed portion. The second contact element has a plastic material, corresponds to a second through hole of the fixed portion, and is in contact with the second driving element. The second through hole is located at a fourth corner of the fixed portion. The first contact element and the second contact element both are fixedly connected to the main plate.

In some embodiments, the thermal conductivity coefficients of the first contact element and the second contact element are both less than the thermal conductivity coefficient of the main plate.

In some embodiments, the Young's modulus of the second movable portion is less than both the Young's modulus of the first contact element and the Young's modulus of the second contact element.

In some embodiments, each of the one or more first guiding assemblies is located at the third corner and/or the fourth corner of the fixed portion, corresponding to the first contact element and/or the second contact element.

In some embodiments, the first movable portion has a first opening, and the second movable portion has a second opening. The first opening and the second opening have different shapes.

In some embodiments, the fixed portion includes a base, a third opening, and a central ring. The base has a plate structure. The base is parallel to the first movable portion and the second movable portion. The third opening is disposed at the center of the base. The central ring protrudes from an upper surface of the base, and is disposed at the periphery of the third opening. The first movable portion is sleeved on the periphery of the central ring through the first opening, and the second movable portion is sleeved on the periphery of the central ring through the second opening. The first opening is substantially oval, and the second opening is substantially circular.

In some embodiments, the fixed portion further includes a gasket. The gasket has a metal material, is fixedly disposed on the central ring, and is disposed between the optical element and the fixed portion. The gasket has a fourth opening. The area of the fourth opening is substantially the same as the area of the third opening, and the area of the fourth opening is smaller than the area of the second opening.

In some embodiments, the central ring of the fixed portion includes a plurality of protrusions, and the optical element includes a plurality of blades corresponding to the protrusions. The protrusions serve as the rotation axis of the blades, and each of the blades is rotatably connected to the fixed portion via one of the protrusions.

In some embodiments, the second movable portion includes a plurality of leading elements, and each of the blades has a slot corresponding to one of the leading elements. The second movable portion leads the blades to move relative to the fixed portion in a third dimension via the leading elements. Each of the protrusions corresponds to one of the leading elements, and the protrusions are closer to a main axis of the optical element driving mechanism than the leading elements.

In some embodiments, the movement of the first movable portion in the first dimension is a linear translational movement, the movement of the second movable portion in the second dimension is a rotational movement about the main axis, and the movements of the blades in the third dimension are rotational movements about the rotation axes. The main axis does not overlap any of the rotation axes.

In some embodiments, the blades are stacked in layers in groups of two, and each of the blades remains overlapped with the adjacent blade during rotation.

In some embodiments, the optical element driving mechanism further includes a third guiding assembly. The third guiding assembly includes a plurality of third guiding elements and a plurality of limiting notches. The plurality of third guiding elements are disposed between the second movable portion and the central ring. The plurality of limiting notches are disposed on the inner surface of the second movable portion, corresponding to the third guiding elements. Each of the third guiding elements is respectively accommodated in one of the limiting notches.

In some embodiments, the plurality of the third guiding elements include at least three third guiding elements.

In some embodiments, the optical element driving mechanism further includes a sensing assembly, sensing the movement of the optical element. The sensing assembly includes a sensing element and a magnetic element. The sensing element is electrically connected to the circuit assembly, and is located at the first corner. The magnetic element corresponds to the sensing element, and is fixedly connected to the first movable portion. The optical element is movable relative to the sensing assembly.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
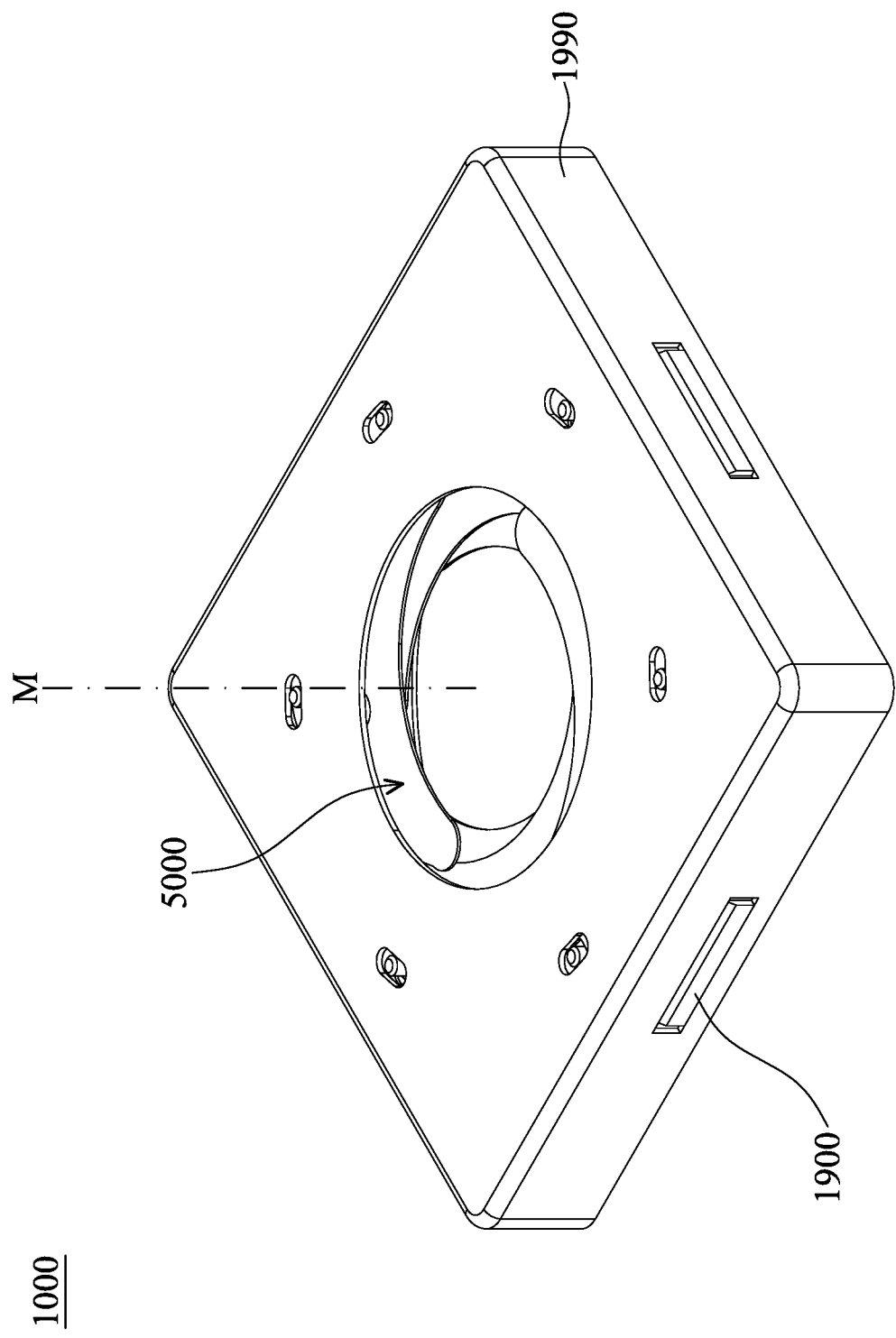
FIG. 1 shows a perspective view of the optical element driving mechanism, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical,"

"above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Referring to FIG. 1, FIG. 1 shows a perspective view of the optical element driving mechanism 1000, according to some embodiments of the present disclosure. The optical element driving mechanism 1000 is used for driving an optical element 5000. In the embodiment shown in FIG. 1, the optical element 5000 is disposed between the fixed portion 1900 and the cover 1990 of the optical element driving mechanism 1000. The optical element 5000 is movable relative to the fixed portion 1900 and the cover 1990 of the optical element driving mechanism 1000. For example, the optical element 5000 may be blades, lenses, optical filters or similar optical elements. In some embodiments, the optical element driving mechanism 1000 drives the optical element 5000 to move in order to change the size of an aperture through which the light passes through along the main axis M.

Figure 2:
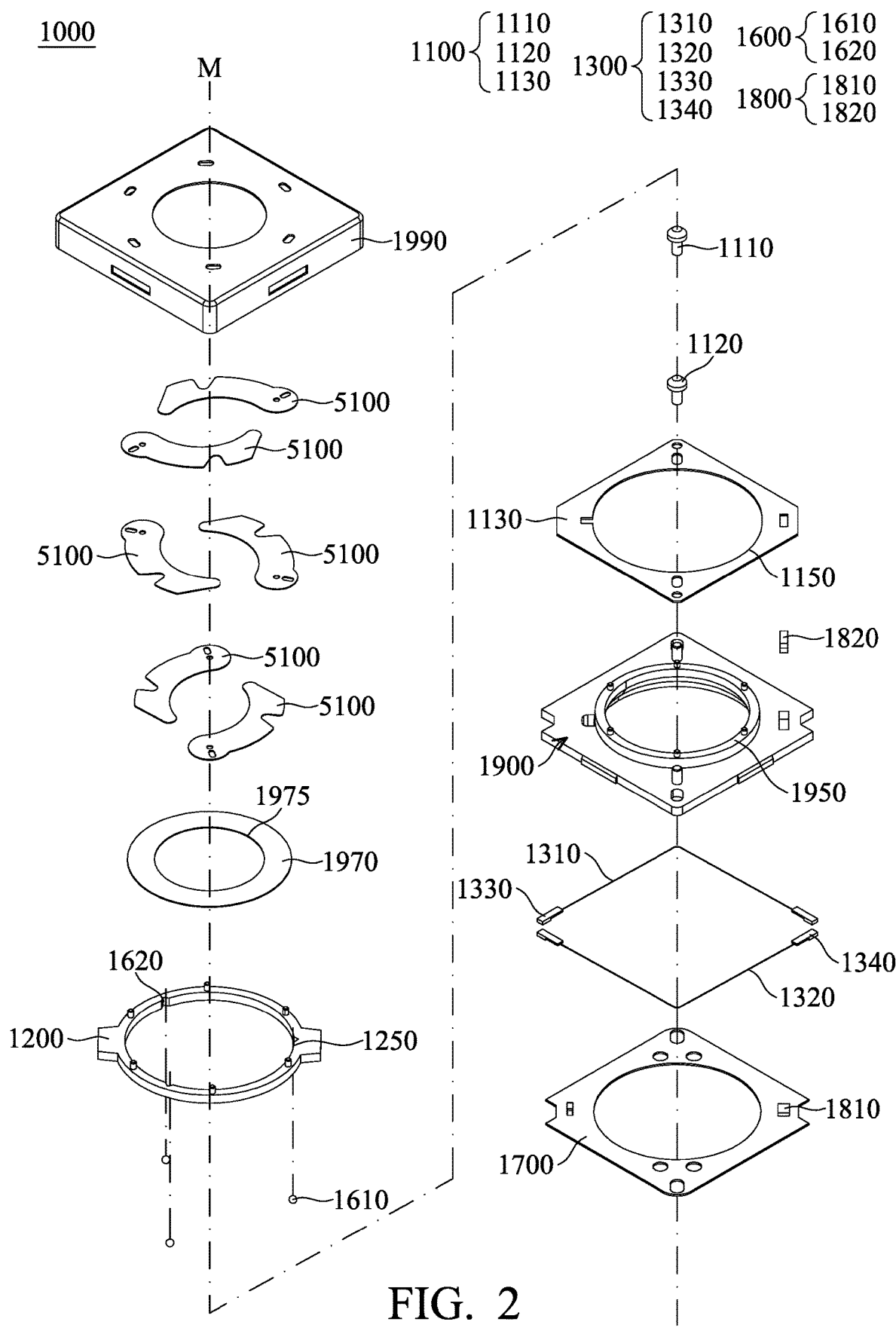
FIG. 2 shows an exploded view of the optical element driving mechanism, according to some embodiments of the present disclosure.

Referring to FIG. 2, FIG. 2 shows an exploded view of the optical element driving mechanism 1000, according to some embodiments of the present disclosure. In the embodiment shown in FIG. 2, the optical element 5000 includes a plurality of blades 5100 that are stacked in layers in groups of two. For example, the six blades 5100 are stacked into three layers in groups of two. Each of the blades 5100 is movable relative to the optical element 5000. The way they move will be described in detail below.

The optical element driving mechanism 1000 mainly includes a first movable portion 1100, a second movable portion 1200, a driving assembly 1300, a circuit assembly 1700, a sensing assembly 1800, a fixed portion 1900, and a cover 1990. In some embodiments according to the present disclosure, the first movable portion 1100 and the second movable portion 1200 both are disposed between the fixed portion 1900 and the cover 1990. The driving assembly 1300 and the circuit assembly 1700 both are disposed beneath the fixed portion 1900.

Figure 3:
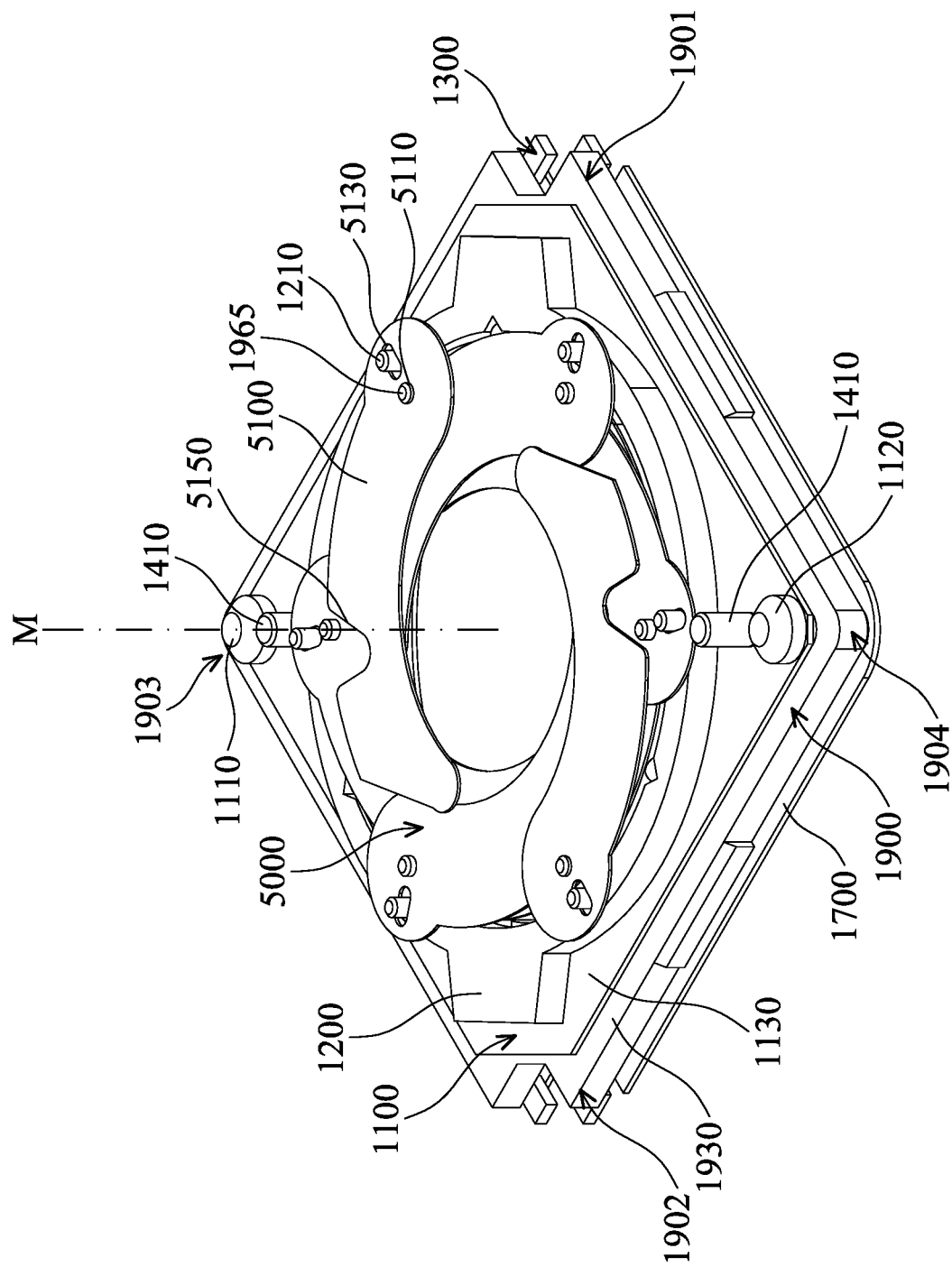
FIG. 3 shows a perspective view of the optical element driving mechanism, wherein the cover is omitted, according to some embodiments of the present disclosure.
Figure 4:
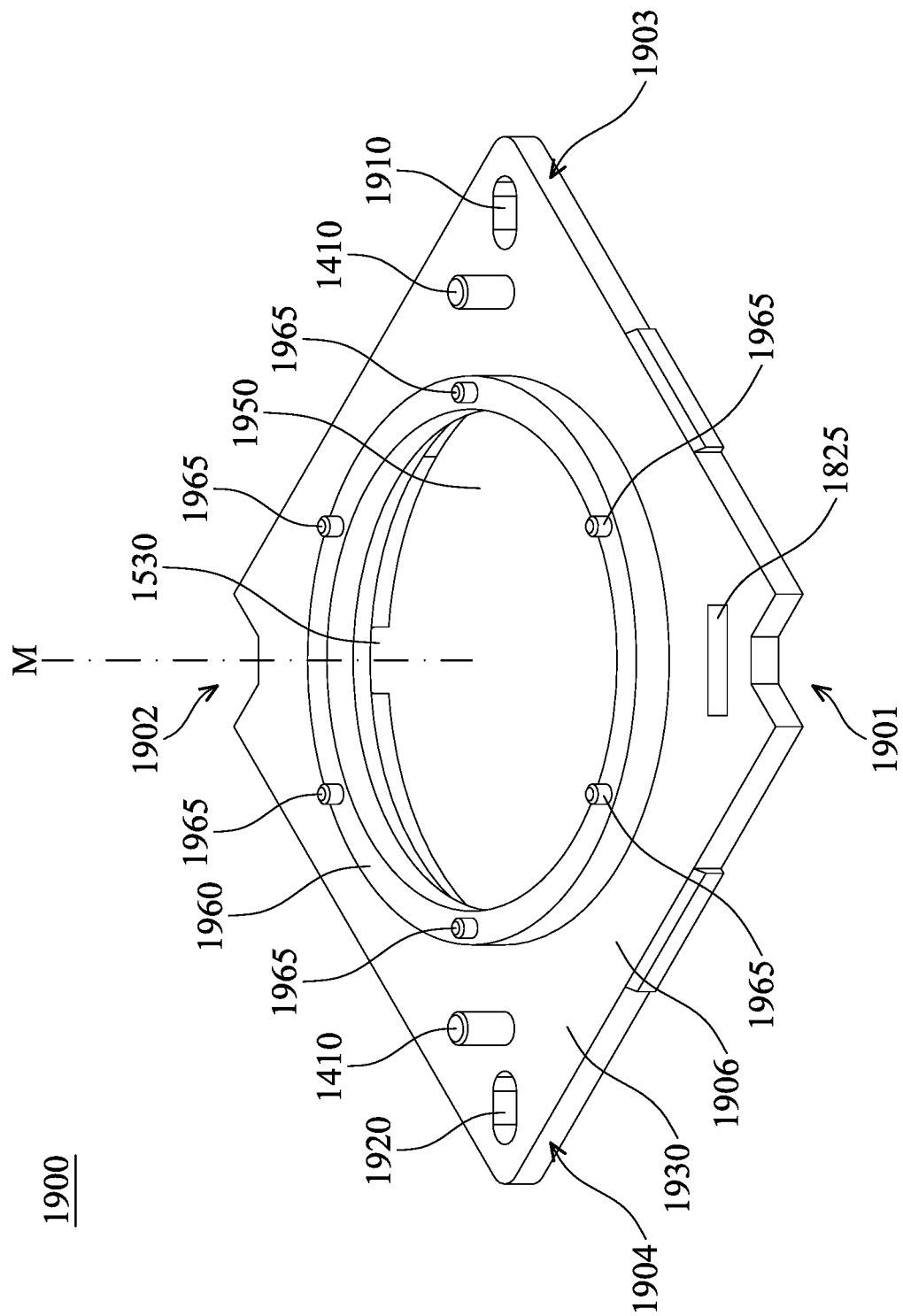
FIG. 4 shows a perspective view of the fixed portion, according to some embodiments of the present disclosure.
Figure 5:
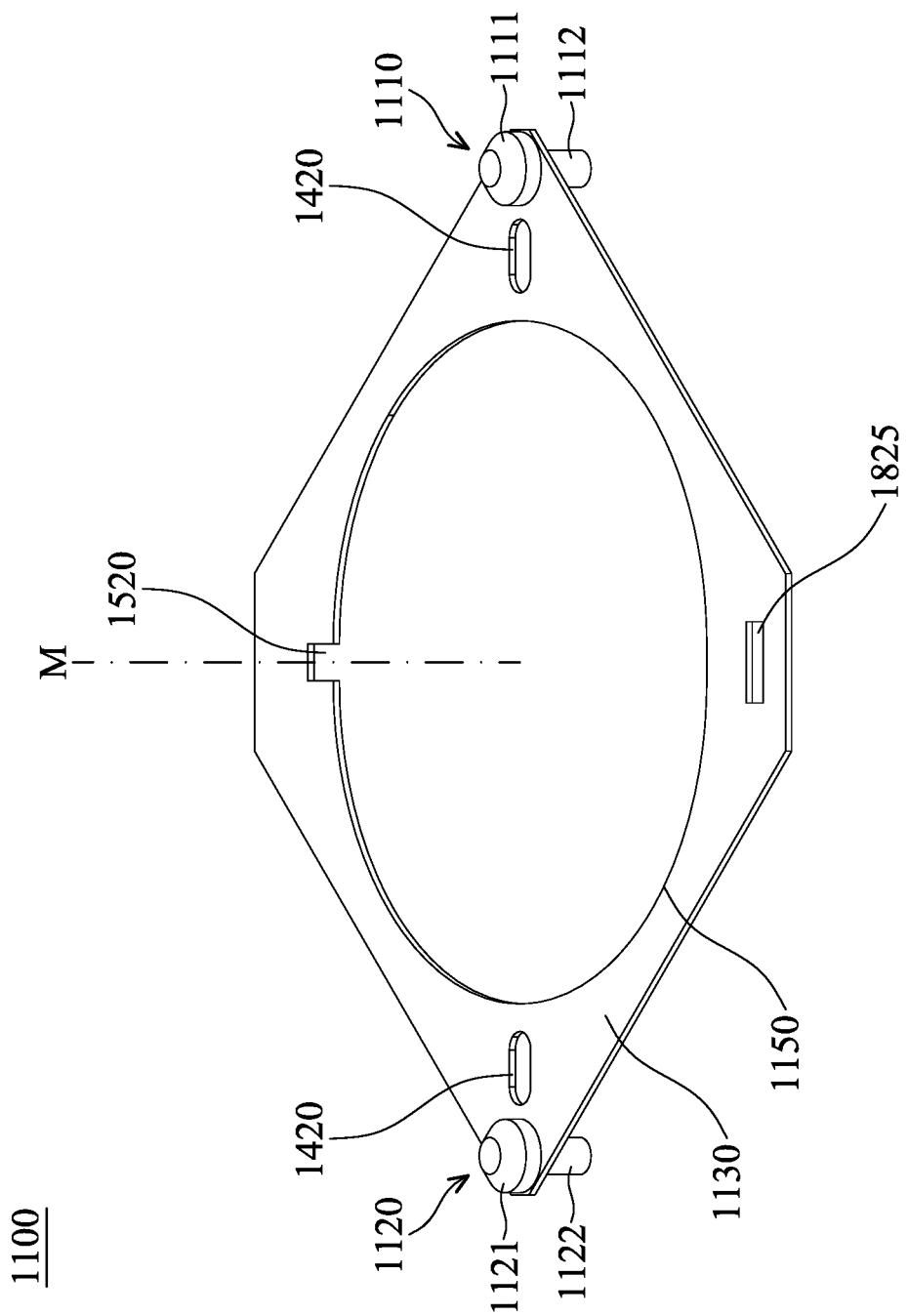
FIG. 5 shows a perspective view of the first movable portion, according to some embodiments of the present disclosure.
Figure 6:
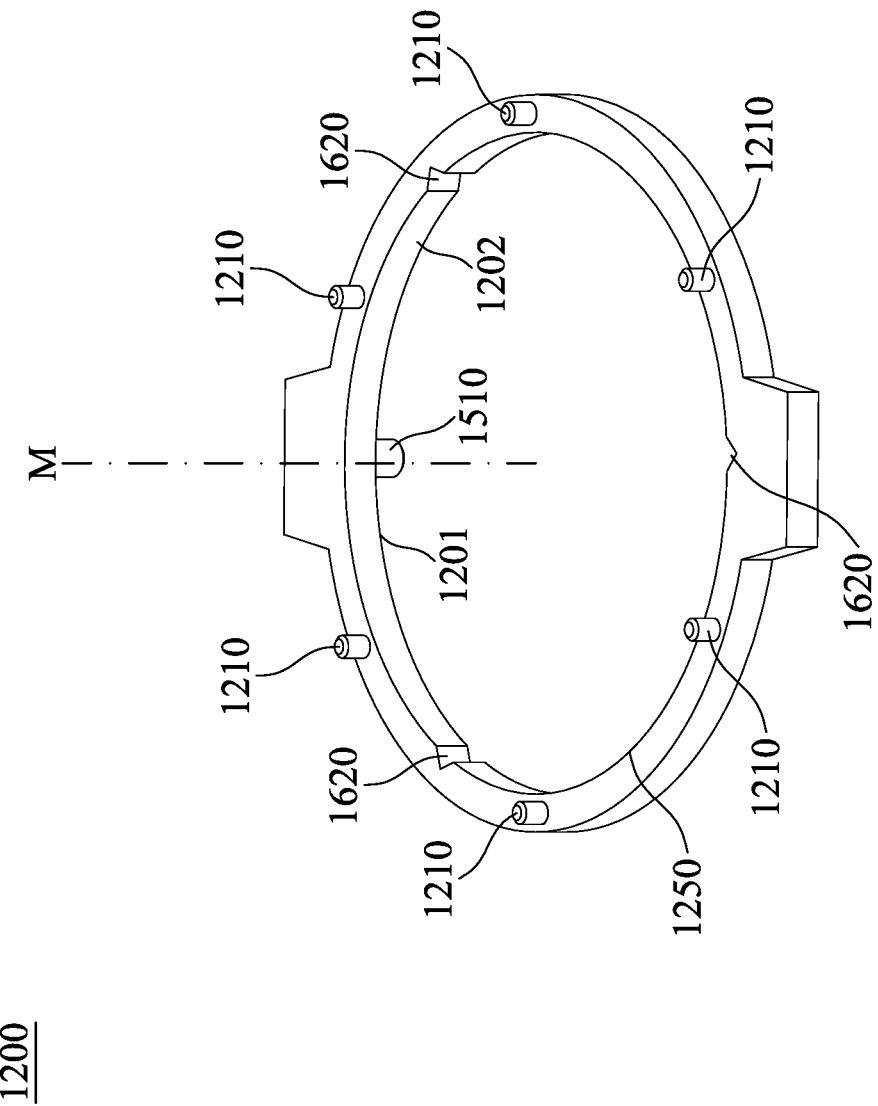
FIG. 6 shows a perspective view of the second movable portion, according to some embodiments of the present disclosure.

Referring to FIG. 2 to FIG. 6, FIG. 3 shows a perspective view of the optical element driving mechanism 1000, wherein the cover 1990 is omitted, according to some embodiments of the present disclosure; FIG. 4 shows a perspective view of the fixed portion 1900, according to some embodiments of the present disclosure; FIG. 5 shows a perspective view of the first movable portion 1100, according to some embodiments of the present disclosure; and FIG. 6 shows a perspective view of the second movable portion 1200, according to some embodiments of the present disclosure. The assembling details of the optical element driving mechanism 1000 will be described with reference to FIG. 2 to FIG. 6.

The first movable portion 1100 has a first opening 1150, and the second movable portion 1200 has a second opening 1250. The second opening 1250 corresponds to the first opening 1150, but the first opening 1150 and the second opening 1250 have different shapes. The fixed portion 1900 includes a base 1930 that has a plate structure. The base 1930 is parallel to the first movable portion 1100 and the second movable portion 1200. The fixed portion 1900 has a third opening 1950 that is disposed at the center of the base 1930. The third opening 1950 corresponds to the first opening 1150 and the second opening 1250, wherein the area of the first opening 1150 is larger than the area of the second opening 1250, and the area of the second opening 1250 is larger than the area of the third opening 1950. In some embodiments, the first opening 1150 is substantially oval, and the second opening 1250 and the third opening 1950 both are substantially circular.

The fixed portion 1900 further includes a central ring 1960 that protrudes from the upper surface 1906 of the base 1930. The central ring 1960 is disposed at the periphery of the third opening 1950. The first movable portion 1100 is sleeved on the periphery of the central ring 1960 through the first opening 1150, and the second movable portion 1200 is sleeved on the periphery of the central ring 1960 through the second opening 1250. In some embodiments according to the present disclosure, the first movable portion 1100 is disposed between the second movable portion 1200 and the fixed portion 1900.

The fixed portion 1900 further includes a gasket 1970. The gasket 1970 has a metal material, is fixedly disposed on the central ring 1960, and is disposed between the optical element 5000 and the fixed portion 1900. In some embodiments, the central ring 1960 includes a plurality of protrusions 1965. The protrusions 1965 protrude from the upper surface of the central ring 1960. The protrusions 1965 may have rod-shaped structures. The gasket 1970 may have a plurality of holes (not shown) corresponding to the protrusions 1965. The gasket 1970 is secured on the central ring 1960 through these holes. The gasket 1970 has a fourth opening 1975 that is disposed at the center of the gasket 1970. The fourth opening 1975 corresponds to the third opening 1950. In some embodiments, the areas of the fourth opening 1975 and the third opening 1950 are substantially the same. Therefore, the area of the fourth opening 1975 is smaller than the area of the second opening 1250.

The first movable portion 1100 includes a main plate 1130. The main plate 1130 has a metal material and a plate structure that is parallel to the base 1930 of the fixed portion 1900. The main plate 1130 is disposed between the second movable portion 1200 and the fixed portion 1900. The first opening 1150 is disposed at the center of the main plate 1130. The first movable portion 1100 further includes a first contact element 1110 and a second contact element 1120. The first contact element 1110 and the second contact element 1120 both have plastic materials, and each includes a head 1111/head 1121 and a shaft 1112/shaft 1122, as shown in FIG. 5. The shaft 1112/shaft 1122 of the first contact element 1110 and the second contact element 1120 extends downward from two opposite corners of the main plate 1130, passing through the first through hole 1910 and the second through hole 1920 (see FIG. 4) of the fixed portion 1900. The head 1111/head 1121 of the first contact element 1110 and the second contact element 1120 remains on top of the main plate 1130. The first contact element 1110 and the second contact element 1120 both are fixedly connected to the main plate 1130. The shaft 1112 and the shaft 1122 that pass through the main plate 1130 and the fixed portion 1900 are in contact with the driving assembly 1300, acting as the point of application for the driving assembly 1300 to drive the first movable portion 1100 to move. In some embodiments, the thermal conductivity coefficients of the first contact element 1110 and the second contact element 1120 are both less than the thermal conductivity coefficient of the main plate 1130, preventing the heat generated by the driving assembly 1300 from affecting the main plate 1130.

In some embodiments, the optical element driving mechanism 1000 further includes one or more first guiding assemblies 1400. In some embodiments according to the present disclosure, the optical element driving mechanism 1000 includes two first guiding assemblies 1400. Each of the first guiding assemblies 1400 includes a first guiding element 1410 and a first guiding opening 1420. The first guiding element 1410 protrudes from the upper surface 1906 of the fixed portion 1900, having a rod-shaped structure. The first guiding opening 1420 is disposed on the first movable portion 1100. The first guiding opening 1420 is an elongated opening extending along the moving direction of the first movable portion 1100. The first guiding element 1410 passes through the first guiding opening 1420, guiding the first movable portion 1100 to move relative to the fixed portion 1900 in the first dimension. In some embodiments, the movement of the first movable portion 1100 in the first dimension is a linear translational movement.

The second movable portion 1200 has a plastic material, and is disposed parallel to the fixed portion 1900. The second movable portion 1200 is movable relative to the first movable portion 1100. Specifically, the optical element driving mechanism 1000 further includes a second guiding assembly 1500 and a third guiding assembly 1600. The second guiding assembly 1500 includes a second guiding element 1510, a second guiding opening 1520, and a limiting cavity 1530. The second guiding element 1510 protrudes from the lower surface 1201 of the second movable portion 1200, having a rod-shaped structure. The second guiding opening 1520 is disposed on the first movable portion 1100. The width of the second guiding opening 1520 is substantially the same as the diameter of the second guiding element 1510. The second guiding element 1510 passes through the second guiding opening 1520, guiding the second movable portion 1200 to move relative to the first movable portion 1100 in the second dimension. In some embodiments, the movement of the second movable portion 1200 in the second dimension is a rotational movement about the main axis M. The limiting cavity 1530 is disposed on the fixed portion 1900, corresponding to the second guiding element 1510 and limiting the moving range of the second guiding element 1510, that is, limiting the rotational angle of the second movable portion 1200. In some embodiments, the Young's modulus of the second movable portion 1200 is less than both the Young's modulus of the first contact element 1110 and the Young's modulus of the second contact element 1120. In this way, the durability of the mechanism may be improved.

The third guiding assembly 1600 includes a plurality of third guiding elements 1610 and a plurality of limiting notches 1620 (see FIG. 2). In some embodiments, the third guiding elements 1610 are circular balls that are disposed between the second movable portion 1200 and the fixed portion 1900. The limiting notches 1620 are disposed on the inner surface 1202 (see FIG. 6) of the second movable portion 1200. The positions of the limiting notch 1620 correspond to the positions of the third guiding elements 1610. Each of the third guiding elements 1610 is accommodated respectively in one of the limiting notches 1620. In some embodiments according to the present disclosure, there are three third guiding elements 1610. The third guiding assembly 1600 is helpful for reducing the friction of the rotational movement of the second movable portion 1200 relative to the fixed portion 1900.

As mentioned above, with the guidance of the first guiding assemblies 1400, the driving assembly 1300 drives the first movable portion 1100 to move relative to the fixed portion 1900 in the first dimension through the first contact element 1110 and the second contact element 1120. With the guidance of the second guiding assembly 1500, the movement of the first movable portion 1100 leads the second movable portion 1200 to move relative to the fixed portion 1900 in the second dimension. The third guiding assembly 1600 is advantageous for the movement of the second movable portion 1200 in the second dimension. In other words, the optical element driving mechanism 1000 according to the present disclosure is able to transform the linear movement of the first movable portion 1100 in the first dimension into the rotational movement of the second movable portion 1200 in the second dimension, leading the optical element 5000 to rotate relative to the fixed portion 1900.

Figure 7:
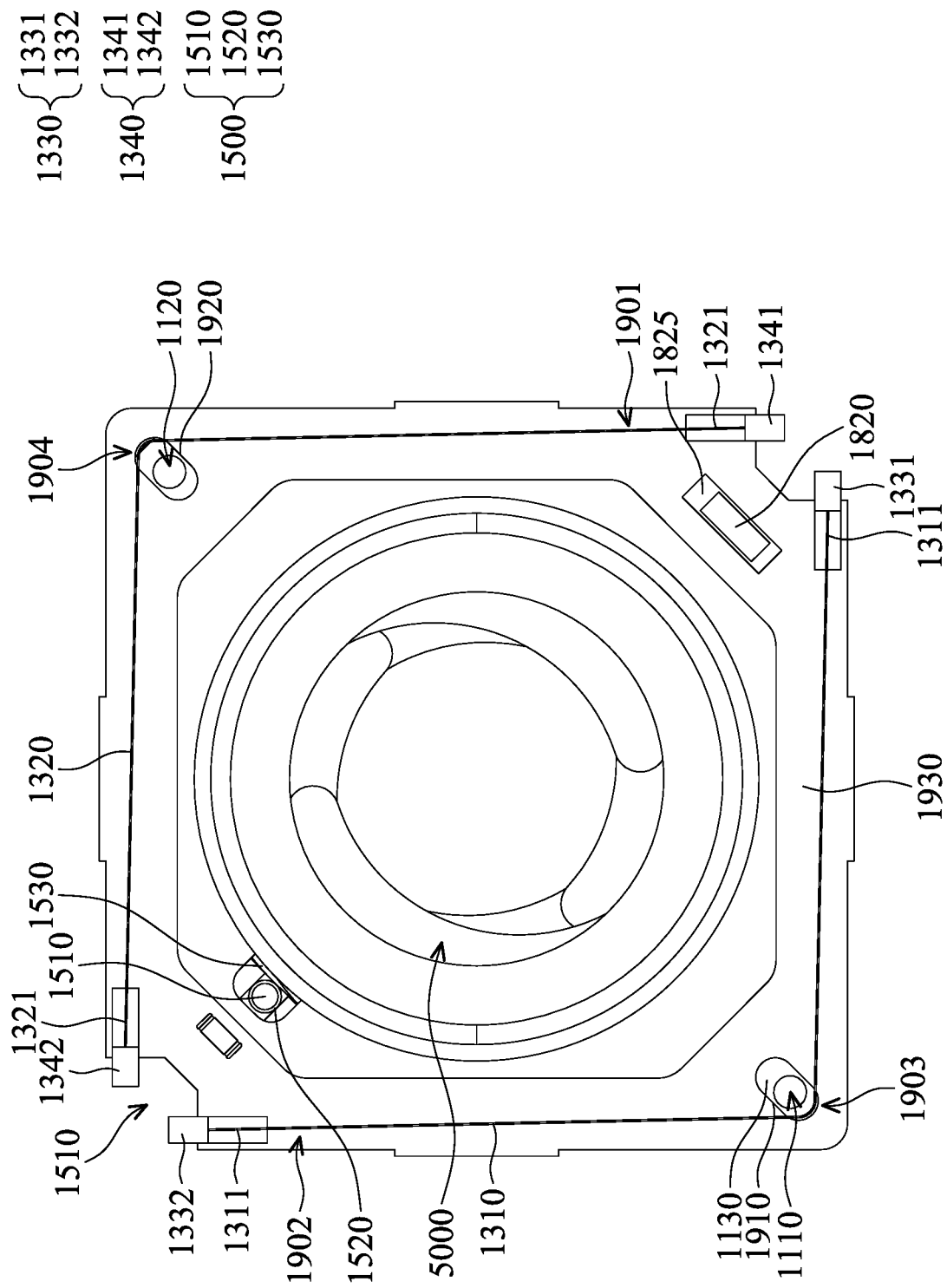
FIG. 7 shows a bottom view of the optical element driving mechanism, wherein the cover and the circuit assembly are omitted, according to some embodiments of the present disclosure.

Referring to FIG. 2, FIG. 3, and FIG. 7, FIG. 7 shows a bottom view of the optical element driving mechanism 1000, wherein the cover 1990 and the circuit assembly 1700 are omitted, according to some embodiments of the present disclosure. As shown in FIG. 7, the driving assembly 1300 is disposed beneath the fixed portion 1900. In some embodiments, the driving assembly 1300 includes a first driving element 1310, a second driving element 1320, a first clamping portion 1330, and a second clamping portion 1340. The first driving element 1310 and the second driving element 1320 may both include shape memory alloy (SMA). When electric current is supplied to the first driving element 1310 and the second driving element 1320, the first driving element 1310 and the second driving element 1320 may be compressed and be in contact with the first contact element 1110 and/or second contact element 1120, thereby pushes the first movable portion 1100 and makes it move relative to the fixed portion 1900.

In some embodiments, the driving assembly 1300 is disposed between the fixed portion 1900 and the circuit assembly 1700. The first driving element 1310 is electrically connected to the circuit assembly 1700 via the first clamping portion 1330, and the second driving element 1320 is electrically connected to the circuit assembly 1700 via the second clamping portion 1340. As shown in FIG. 7, the first clamping portion 1330 includes a first clamping part 1331 that is located at the first corner 1901 of the fixed portion 1900 and a second clamping part 1332 that is located at the second corner 1902 of the fixed portion 1900. The first clamping part 1331 and the second clamping part 1332 hold the two ends 1311 of the first driving element 1310. Similarly, the second clamping portion 1340 includes a third clamping part 1341 that is located at the first corner 1901 of the fixed portion 1900 and a fourth clamping part 1342 that is located at the second corner 1902 of the fixed portion 1900. The third clamping part 1341 and the fourth clamping part 1342 hold the two ends 1321 of the second driving element 1320. In some embodiments, the first clamping part 1331 and the third clamping part 1341 that are located at the first corner 1901 are disposed perpendicularly to each other, and the second clamping part 1332 and the fourth clamping part 1342 that are located at the second corner 1902 are disposed perpendicularly to each other. Through the disposal of the first clamping portion 1330 and the second clamping portion 1340, the first driving element 1310 and the second driving element 1320 are in substantially opposite L shapes, wherein the bending points of the L shapes are in contact with the first contact element 1110 and the second contact element 1120, which act as the point of application for the driving assembly 1300 to drive the first movable portion 1100 to move.

As shown in FIG. 7, the first contact element 1110 and the corresponding first through hole 1910 are located at the third corner 1903 of the fixed portion 1900, and the second contact element 1120 and the corresponding second through hole 1920 are located at the fourth corner 1904 of the fixed portion 1900. In some embodiments according to the present disclosure, the first corner 1901 and the second corner 1902 are two opposite corners that are located diagonally, and the third corner 1903 and the fourth corner 1904 are another two opposite corners that are located diagonally. Since the first contact element 1110 and the second contact element 1120 are located at diagonal corners of the fixed portion 1900, the moving direction of the first movable portion 1100 is along the diagonal line of the fixed portion 1900. Thus, the first opening 1150 of the first movable portion 1100 is in an oval shape that elongates along its moving direction.

In some embodiments, each of the one or more first guiding assemblies 1400 is located at the third corner 1903 and/or fourth corner 1904 of the fixed portion 1900. For example, as shown in FIGS. 4 and 5, in the embodiments that include two first guiding assemblies 1400, the first guiding assemblies 1400 are located at the third corner 1903 and the fourth corner 1904 of the fixed portion 1900 respectively, corresponding to the first contact element 1110 and the second contact element 1120. In some embodiments, the first guiding assemblies 1400 are closer to the main axis M than the first contact element 1110 and the second contact element 1120. That is, the first guiding assemblies 1400 are closer to the center of the optical element driving mechanism 1000. In some embodiments, the second guiding assembly 1500 is located at the second corner 1902 of the fixed portion 1900, as shown in FIG. 7.

In some embodiments, the sensing assembly 1800 is disposed at the first corner 1901, as shown in FIG. 7. The sensing assembly 1800 is used for sensing the movement of the optical element 5000. Specifically, the sensing assembly 1800 includes a sensing element 1810 and a magnetic element 1820. The sensing element 1810 is electrically connected to the circuit assembly 1700, such as fixedly disposed on the circuit assembly 1700. In some embodiments, the sensing element 1810 may be a Hall sensor or other suitable sensors. The magnetic element 1820 corresponds to the sensing element 1810, and is fixedly connected to the first movable portion 1100. In some embodiments, a receiving part 1825 is disposed on the first movable portion 1100 (see FIG. 5) for receiving the magnetic element 1820. In some further embodiments, a receiving part 1825 is also disposed on the fixed portion 1900 (see FIG. 4) for receiving the magnetic element 1820. In these embodiments, the receiving part 1825 is located at the first corner 1901 (see FIG. 7). Since the first movable portion 1100 is able to lead the optical element 5000 to move (through the second movable portion 1200), the sensing element 1810 is able to calculate the motion of the optical element 5000 by sensing the position of the sensing element 1810 on the first movable portion 1100, and obtain results such as the size of the aperture. In some embodiments, the optical element 5000 is movable relative to the sensing assembly 1800. That is, the optical element 5000 is movable relative to the sensing element 1810 and to the magnetic element 1820.

Referring to FIG. 3 and FIGS. 8A-8C, FIGS. 8A-8C show top views of the optical element 5000 when it moves to different positions, wherein the cover 1990 and the circuit assembly 1700 are omitted, according to some embodiments of the present disclosure. As shown, the central ring 1960 includes a plurality of protrusions 1965, and the optical element 5000 includes a plurality of blades 5100 that correspond to these protrusions 1965. In figures disclosed by the present application, the central ring 1960 includes six protrusions 1965, and the optical element 5000 includes six blades 5100, accordingly. These protrusions 1965 serve as the rotation axes of the blades 5100. Each of the blades 5100 includes a connecting hole 5110. Each of the blades 5100 is rotatably joined with one of the protrusion 1965 via the connecting hole 5110, so that the blades 5100 are rotatably connected to the fixed portion 1900 via the protrusions 1965.

The second movable portion 1200 includes a plurality of leading elements 1210, and each of the blades 5100 has a slot 5130 corresponding to one of the leading elements 1210. The leading elements 1210 protrude from the upper surface of the second movable portion 1200. The leading elements 1210 may have rod-shaped structures. The leading elements 1210 pass through the slots 5130 of the blades 5100. When the second movable portion 1200 rotates relative to the fixed portion 1900, the leading elements 1210 may lead the blades 5100 to move relative to the fixed portion 1900 in the third dimension. In some embodiments, the movements of the blades 5100 in the third dimension are rotational movements about the rotation axes (protrusions) 1965. It should be noted that the main axis M does not overlap any of the rotation axes 1965. Each of the blades 5100 may rotate about a different rotation axis 1965, thereby adjusting the size of the aperture through which the light passes through along the main axis M.

Figure 8A:
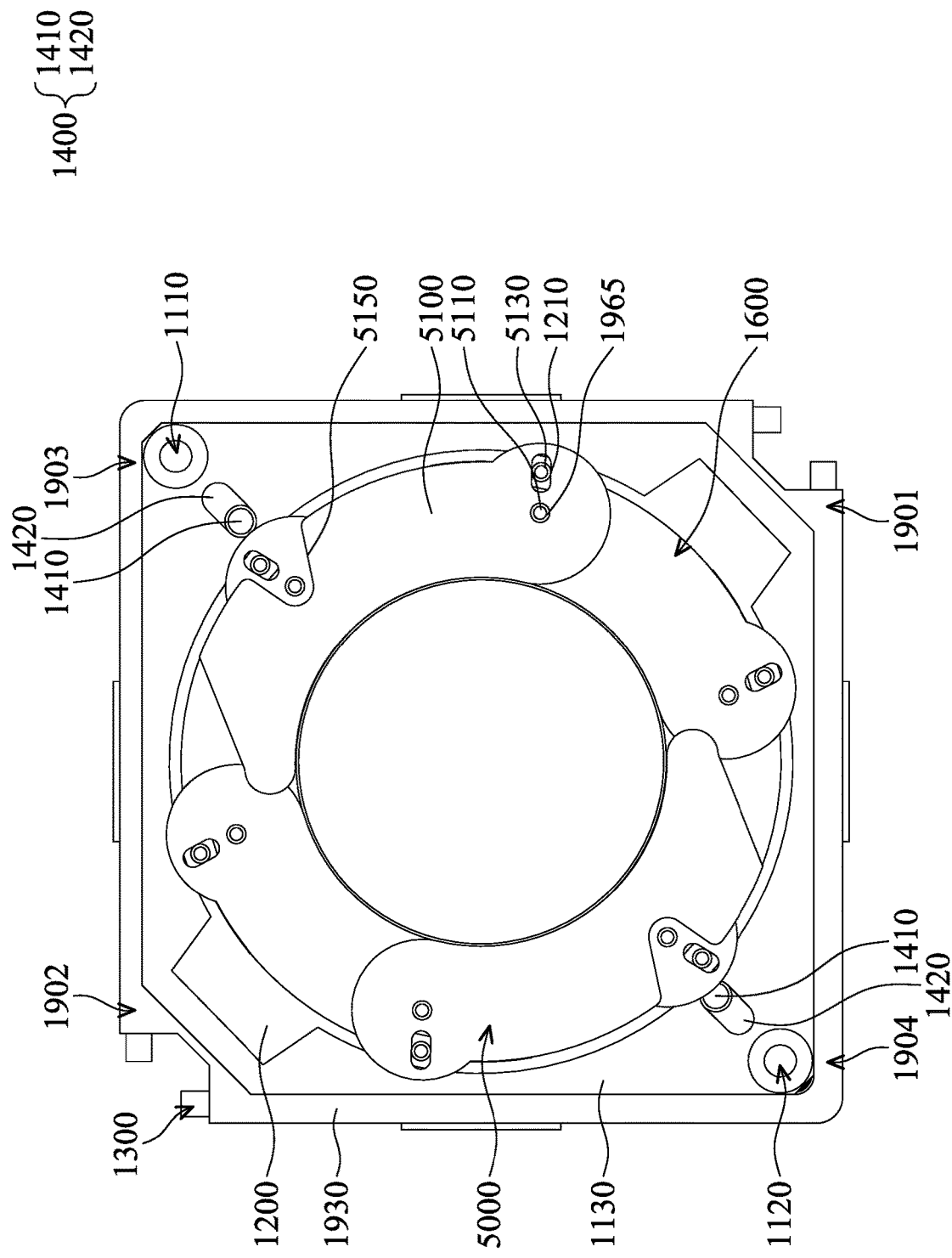
FIGS. 8A-8C show top views of the optical element driving mechanism when it moves to different positions, wherein the cover and the circuit assembly are omitted, according to some embodiments of the present disclosure.

In the embodiment shown in FIG. 8A, the positions of the blades 5100 make the maximum aperture. At this moment, the size of the aperture formed by multiple blades 5100 is substantially the same as the area of the fourth opening 1975 of the gasket 1970. In other words, the area of the fourth opening 1975 of the gasket 1970 determines the maximum aperture of the optical element driving mechanism 1000. In some embodiments, each of the blades 5100 has a recess 5150, corresponding to the rotation axis 1965 of the adjacent blade 5100. The disposal of the recesses 5150 may limit the rotation range of the blades 5100. When a recess 5150 is in contact with a rotation axis (protrusion) 1965, the blade 5100 is prevented from continuing to rotate outward. This reduce the risk of blades 5100 falling off.

When an electric current is supplied to the driving assembly 1300, the first driving element 1310 and the second driving element 1320 compress and contact the first contact element 1110 and the second contact element 1120, so that the first movable portion 1100 leads the second movable portion 1200 to move, and then leads the optical element 5000 to rotate. At this moment, the optical element 5000 may move to the position shown in FIG. 8B. If the electric current is continuously supplied, the optical element 5000 may continue to move to the position shown in FIG. 8C. The moving range of the optical element 5000 is limited by the rotation range of the second movable portion 1200. As mentioned above, the rotation range of the second movable portion 1200 is limited by the size of the limiting cavity 1530 that is disposed on the fixed portion 1900. Or, the lengths of the first guiding openings 1420 that are disposed on the first movable portion 1100 may limit the moving range of the first movable portion 1100, and indirectly limit the rotation range of the second movable portion 1200. The limitations of the moving range or the rotation range is helpful for improving the durability of the mechanism.

Figure 8B:
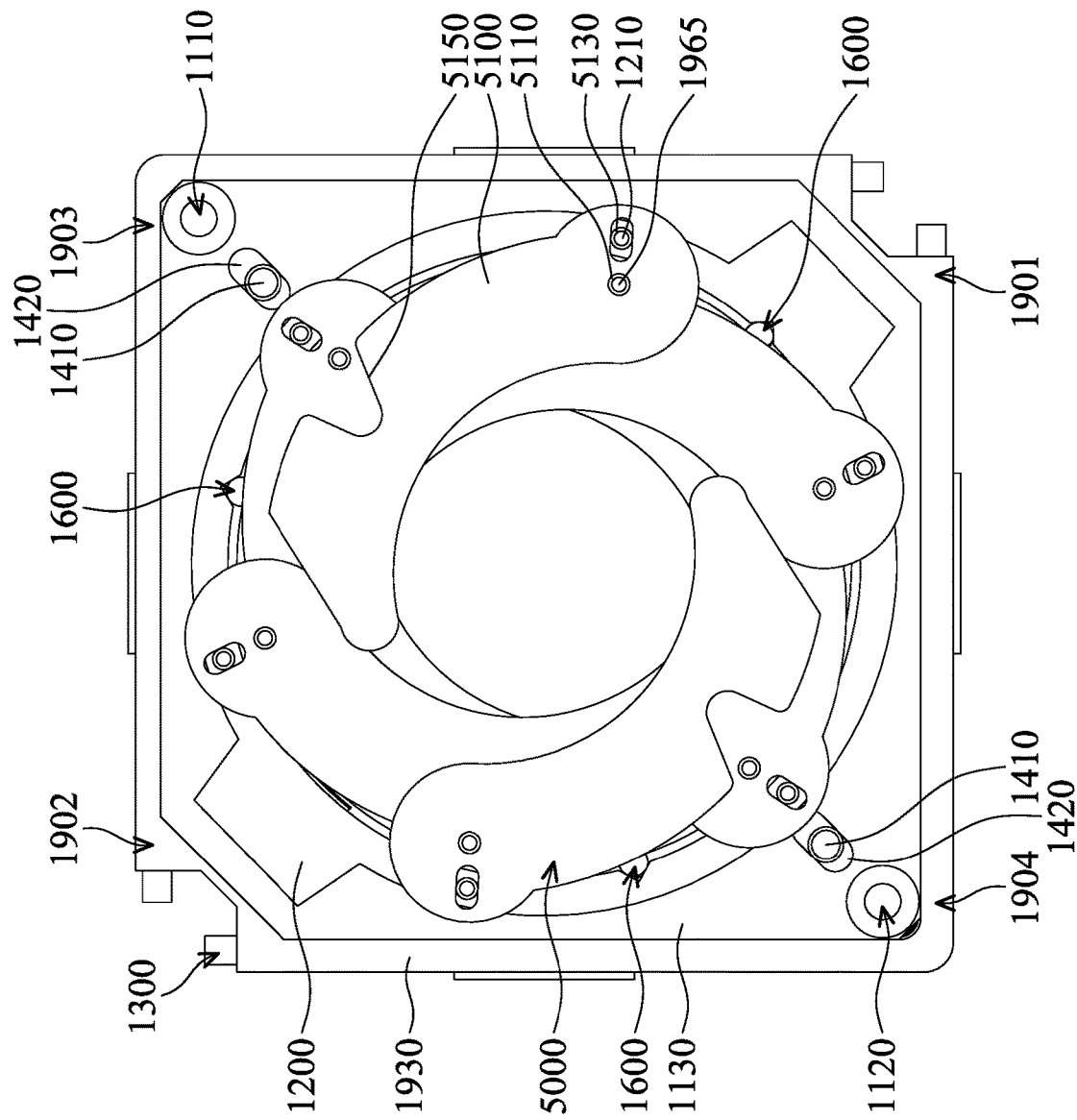
Figure 8C:
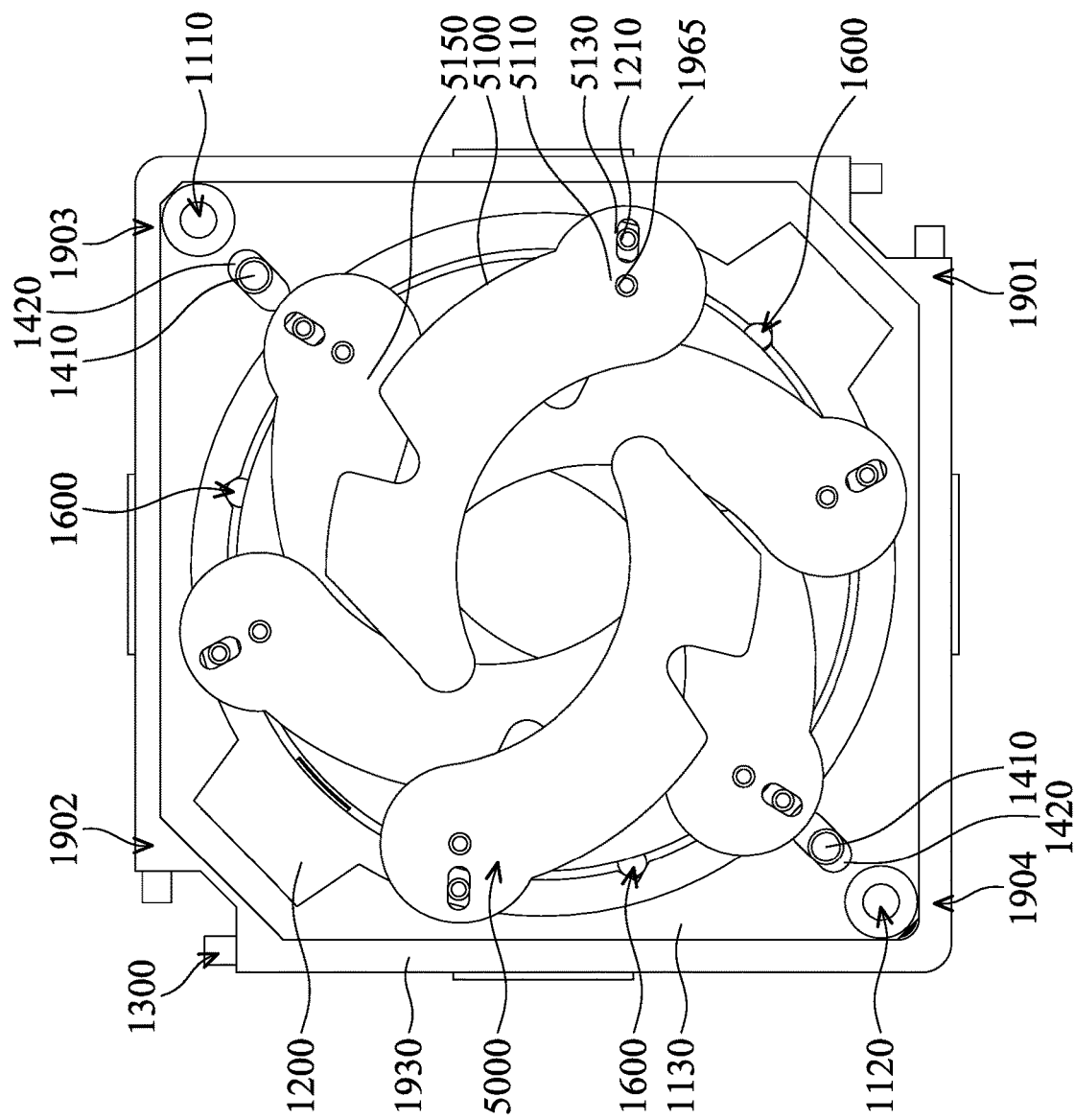

As shown in FIGS. 8A to 8C, each of the blades 5100 remains overlapped with the adjacent blade 5100 during rotation, so that the blades 5100 remains stacked in layers in groups of two. This is advantageous for improving the durability of the mechanism. In addition, as shown, each of the blades 5100 has a connecting hole 5110 and a slot 5130, and the position of the connecting hole 5110 and the position of the slot 5130 correspond to each other. In other words, each of the protrusions 1965 corresponds to one of the leading elements 1210. Also, the protrusions 1965 are closer to the main axis M of the optical element driving mechanism 1000 than the leading elements 1210.

In summary, an optical element driving mechanism 1000 is provided in some embodiments according to the present disclosure. The driving assembly 1300 that includes shape memory alloy is used for driving the first movable portion 1100 to perform translational movements, which leads the second movable portion 1200 to perform rotational movements, and then leads the optical element 5000 to perform rotational movements relative to the fixed portion 1900. Compared with regular coil motors, the driving assembly 1300 according to the present disclosure is able to reduce the external magnetic interference that may affect the optical element driving mechanism 1000. This is advantageous for improving the durability of the mechanism and achieving mechanism miniaturization.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism comprising:
    a fixed portion;
    a first movable portion, movable relative to the fixed portion;
    a driving assembly, driving the first movable portion to move relative to the fixed portion;
    one or more first guiding assemblies, each comprising:
        a first guiding element, protruding from an upper surface of the fixed portion; and
        a first guiding opening, disposed on the first movable portion, wherein the first guiding element passes through the first guiding opening;
    a second movable portion with a plastic material, being parallel to the fixed portion, and movable relative to the first movable portion; and
    a second guiding assembly, comprising:
        a second guiding element, protruding from a lower surface of the second movable portion;
        a second guiding opening, disposed on the first movable portion, wherein the second guiding element passes through the second guiding opening; and
        a limiting cavity, disposed on the fixed portion, corresponding to the second guiding element and limiting the moving range of the second guiding element;
    wherein the first movable portion leads an optical element to move;
    wherein with the one or more first guiding assemblies, the first movable portion is movable relative to the fixed portion in a first dimension; and
    wherein with the second guiding assembly, the first movable portion leads the second movable portion to move relative to the fixed portion in a second dimension.

2. The optical element driving mechanism as claimed in claim 1, wherein the driving assembly comprises:
    a first driving element, including a shape memory alloy;
    a first clamping portion, including a first clamping part located at a first corner of the fixed portion and a second clamping part located at a second corner of the fixed portion, wherein the first clamping part and the second clamping part hold the two ends of the first driving element;
    a second driving element, including a shape memory alloy; and
    a second clamping portion, including a third clamping part located at the first corner of the fixed portion and a fourth clamping part located at the second corner of the fixed portion, wherein the third clamping part and the fourth clamping part hold the two ends of the second driving element;
    wherein the first clamping part and the third clamping part that are located at the first corner are disposed perpendicularly to each other, and the second clamping part and the fourth clamping part that are located at the second corner are disposed perpendicularly to each other.

3. The optical element driving mechanism as claimed in claim 2, further comprising a circuit assembly, wherein the driving assembly is disposed between the fixed portion and the circuit assembly, and the first driving element is electrically connected to the circuit assembly via the first clamping portion, and the second driving element is electrically connected to the circuit assembly via the second clamping portion.

4. The optical element driving mechanism as claimed in claim 2, wherein the second guiding assembly is located at the second corner of the fixed portion.

5. The optical element driving mechanism as claimed in claim 2, wherein the first movable portion comprises:
    a main plate, having a metal material and a plate structure, disposed in parallel to the fixed portion, wherein the main plate is disposed between the second movable portion and the fixed portion;
    a first contact element, having a plastic material, corresponding to a first through hole of the fixed portion, and being in contact with the first driving element, wherein the first through hole is located at a third corner of the fixed portion; and
    a second contact element, having a plastic material, corresponding to a second through hole of the fixed portion, and being in contact with the second driving element, wherein the second through hole is located at a fourth corner of the fixed portion;
    wherein the first contact element and the second contact element both are fixedly connected to the main plate.

6. The optical element driving mechanism as claimed in claim 5, wherein the thermal conductivity coefficients of the first contact element and the second contact element are both less than the thermal conductivity coefficient of the main plate.

7. The optical element driving mechanism as claimed in claim 5, wherein the Young's modulus of the second movable portion is less than both the Young's modulus of the first contact element and the Young's modulus of the second contact element.

8. The optical element driving mechanism as claimed in claim 5, wherein each of the one or more first guiding assemblies is located at the third corner and/or the fourth corner of the fixed portion, corresponding to the first contact element and/or the second contact element.

9. The optical element driving mechanism as claimed in claim 1, wherein the first movable portion has a first opening, and the second movable portion has a second opening;
wherein the first opening and the second opening have different shapes.

10. The optical element driving mechanism as claimed in claim 9, wherein the fixed portion comprises:
a base, having a plate structure, parallel to the first movable portion and the second movable portion;
a third opening, disposed at the center of the base; and
a central ring, protruding from an upper surface of the base, and disposed at the periphery of the third opening;
wherein the first movable portion is sleeved on the periphery of the central ring through the first opening, and the second movable portion is sleeved on the periphery of the central ring through the second opening;
wherein the first opening is substantially oval, and the second opening is substantially circular.

11. The optical element driving mechanism as claimed in claim 10, wherein the fixed portion further comprises:
a gasket, having a metal material, fixedly disposed on the central ring, and disposed between the optical element and the fixed portion;
wherein the gasket has a fourth opening, the area of the fourth opening is substantially the same as the area of the third opening, and the area of the fourth opening is smaller than the area of the second opening.

12. The optical element driving mechanism as claimed in claim 10, wherein:
the central ring of the fixed portion comprises a plurality of protrusions, and the optical element comprises a plurality of blades corresponding to the protrusions, wherein the protrusions serve as the rotation axis of the blades, and each of the blades is rotatably connected to the fixed portion via one of the protrusions.

13. The optical element driving mechanism as claimed in claim 12, wherein:
the second movable portion comprises a plurality of leading elements, and each of the blades has a slot corresponding to one of the leading elements;
the second movable portion leads the blades to move relative to the fixed portion in a third dimension via the leading elements; and
each of the protrusions corresponds to one of the leading elements, and the protrusions are closer to a main axis of the optical element driving mechanism than the leading elements.

14. The optical element driving mechanism as claimed in claim 13, wherein the movement of the first movable portion in the first dimension is a linear translational movement, the movement of the second movable portion in the second dimension is a rotational movement about the main axis, and the movements of the blades in the third dimension are rotational movements about the rotation axes;
wherein the main axis does not overlap any of the rotation axes.

15. The optical element driving mechanism as claimed in claim 10, wherein the blades are stacked in layers in groups of two, and each of the blades remains overlapped with the adjacent blade during rotation.

16. The optical element driving mechanism as claimed in claim 10, further comprising a third guiding assembly, wherein the third guiding assembly comprises:
a plurality of third guiding elements, disposed between the second movable portion and the central ring; and
a plurality of limiting notches, disposed on the inner surface of the second movable portion, corresponding to the third guiding elements;
wherein each of the third guiding elements is respectively accommodated in one of the limiting notches.

17. The optical element driving mechanism as claimed in claim 16, wherein the plurality of the third guiding elements include at least three third guiding elements.

18. The optical element driving mechanism as claimed in claim 3, further comprising a sensing assembly, sensing the movement of the optical element, including:
a sensing element, electrically connected to the circuit assembly, located at the first corner; and
a magnetic element, corresponding to the sensing element, fixedly connected to the first movable portion;
wherein the optical element is movable relative to the sensing assembly.

* * * * *